May 13, 1947.   C. JOHNSON   2,420,430.
GAS ANALYZER
Filed May 26, 1943   6 Sheets-Sheet 1
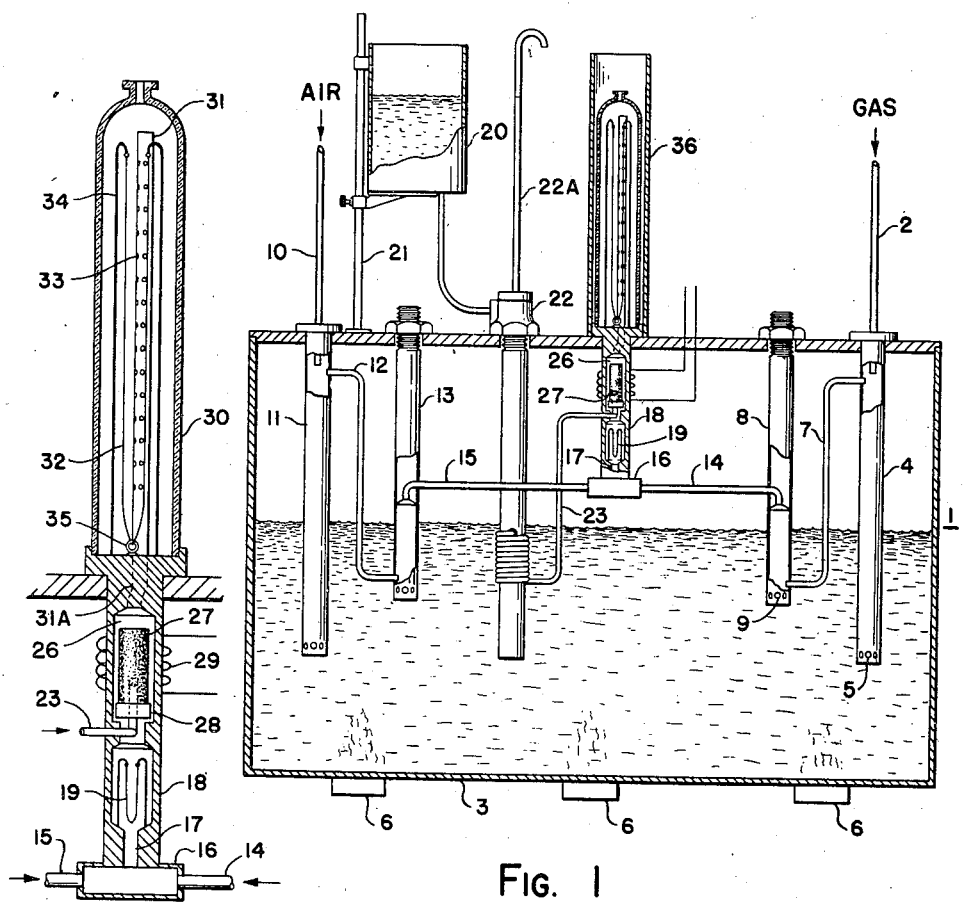
FIG. 1
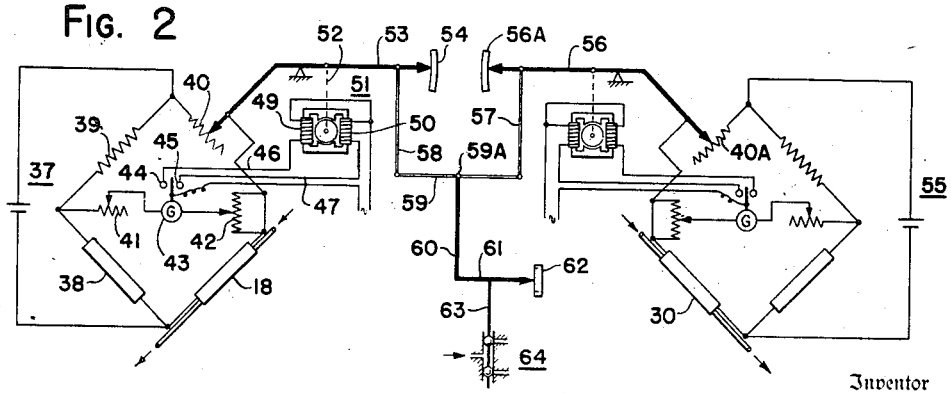
FIG. 2
FIG. 3
Inventor
CLARENCE JOHNSON
By Raymond D. Junkins
Attorney May 13, 1947. C. JOHNSON 2,420,430
GAS ANALYZER
Filed May 26, 1943 6 Sheets-Sheet 4
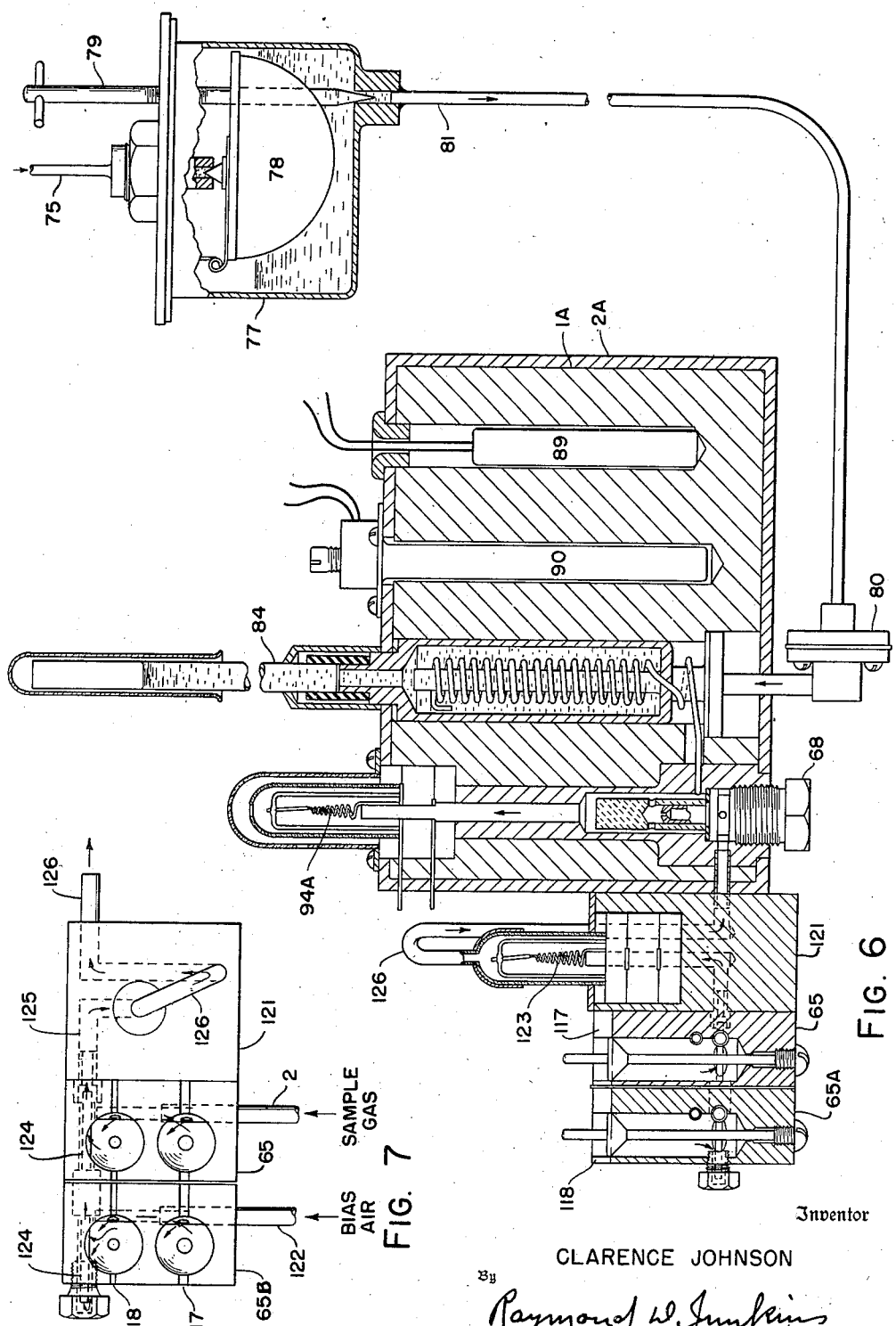
Inventor
CLARENCE JOHNSON
By Raymond W. Jenkins
Attorney

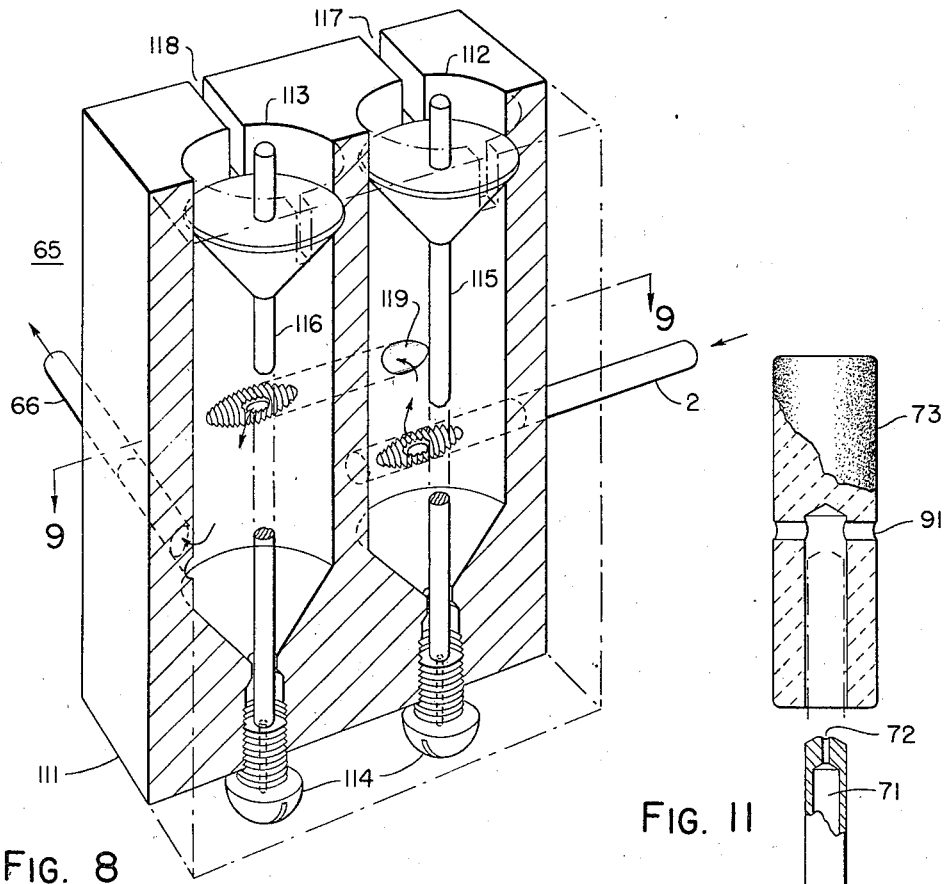
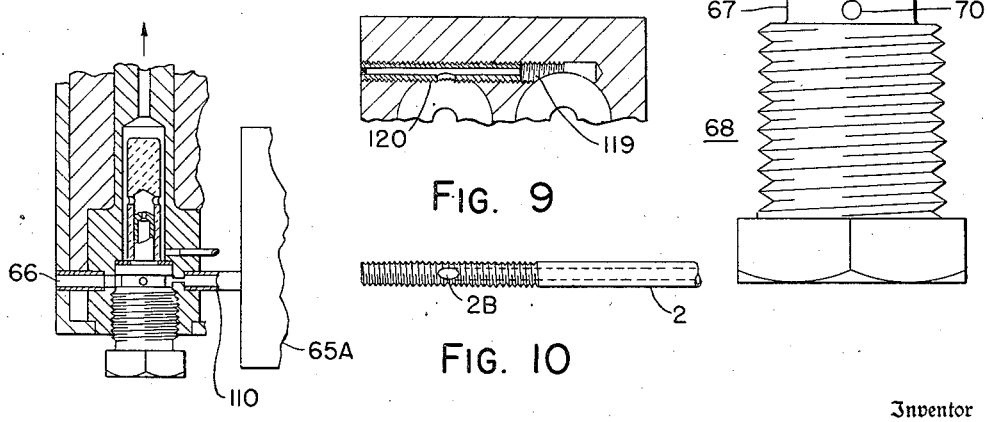

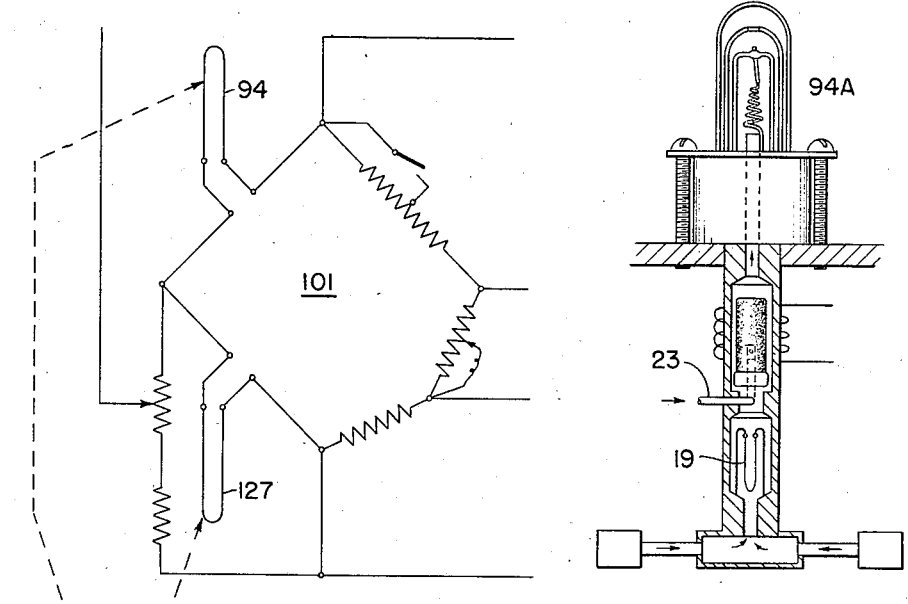
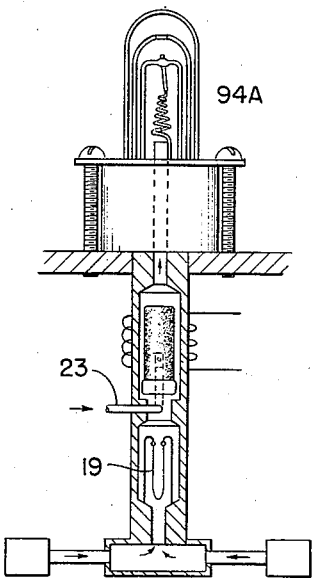
FIG. 14
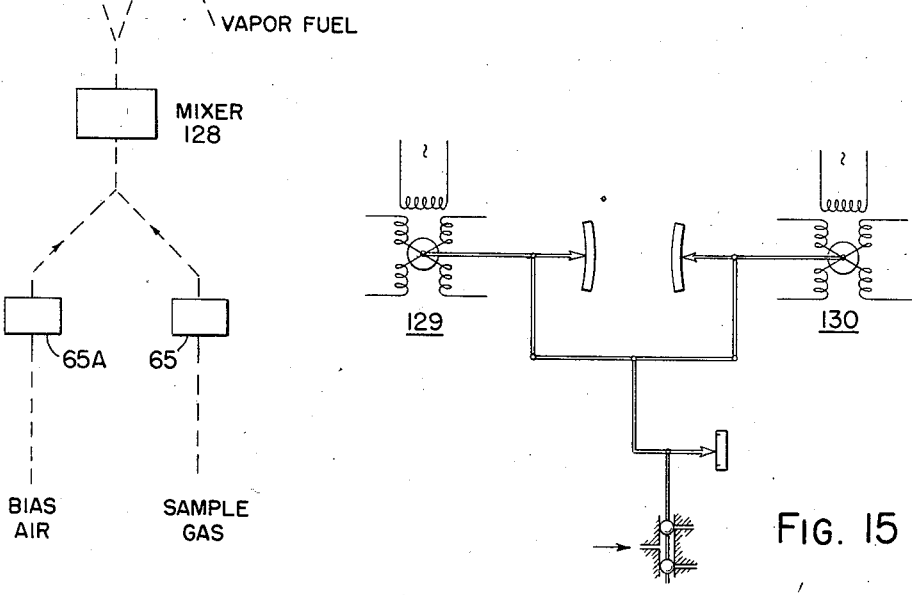
FIG. 15
FIG. 13

Patented May 13, 1947

2,420,430

UNITED STATES PATENT OFFICE 2,420,430

GAS ANALYZER

Clarence Johnson, South Euclid, Ohio, assignor to Bailey Meter Company, a corporation of Delaware Application May 26, 1943, Serial No. 488,600

4 Claims. (Cl. 23—255)

This invention relates to a system and apparatus for analyzing gases to determine qualitatively and quantitatively a constituent or constituents of the sample gas stream. More particularly I am concerned with providing an improved means for determining the percentage of free oxygen and/or gaseous combustible in a flowing gas sample, such as for example a sample stream of flue gas from a combustion process or the exhaust gases from an internal combustion engine.

The particular arrangement which I will describe is directed to the continuous analysis of a flowing sample stream of the gaseous products of combustion from a fuel fired furnace. Such gases will contain nitrogen, carbon dioxide, free oxygen or excess air, possibly a small amount of carbon monoxide, methane, or other unburned combustible, and traces of other gases. I desirably ascertain the percentage of free oxygen and may visually indicate it in terms of free oxygen or in terms of excess air. Under certain operating conditions it is desirable to ascertain the percentage (if any) of unburned combustible in the gas.

While I have chosen certain particular embodiments as a preferred illustration, it is to be understood that the apparatus and system is broadly adapted to the analysis of a gaseous mixture to determine a constituent or constituents thereof, and is not limited to the analysis for free oxygen and/or combustible only. In other words, certain portions of the apparatus at least are useful in gas analyzing systems for determining the percentage of carbon dioxide, carbon monoxide, or other constituents in any gaseous stream.

There are several known methods of continuously analyzing a flowing gas stream to determine a constituent thereof. I have chosen to embody my invention in connection with the method employing catalytic combustion. The catalyst comprises a leg of a Wheatstone bridge adapted to measure the change in electrical resistance of said leg, due to the burning thereon of varying amounts of free oxygen with a supplied fuel.

In order to start the catalytic action it is necessary that the catalytic wire be initially heated to a temperature of approximately 700° F., and this is done electrically. A gaseous mixture is continuously passed over the catalyst and comprises a mixture of a uniform rate of flow stream of the sample to be analyzed and a uniform rate of flow stream of a gaseous fuel for combining with the free oxygen of the gas sample stream. In certain instances I preferably add a third stream which I term "bias air," being a predetermined constant rate of flow of oxygen (air).

It is known that the fuel supplied to such a system may be a gas, such as hydrogen, or a vaporized liquid fuel such as methyl alcohol for example. In the present embodiment I utilize a vaporizable liquid fuel of which the vapor is supplied to the analyzing cell at a uniform rate.

Such an analyzing apparatus will be successful and satisfactory only if the gas sample stream and the vapor fuel stream are individually of uniform rate and are thoroughly mixed prior to entering the catalytic combustion chamber. A principal object of the present invention is therefore to so provide means for controlling the liquid fuel and its vapor and for controlling the gas sample stream. Other objects will become apparent from a study of the specification and drawings, in which:

Fig. 1 is a sectional elevation of one embodiment of my analyzer.

Fig. 2 is a detail of the analyzing portion of Fig. 1.

Fig. 3 is an electrical circuit diagram of the apparatus of Figs. 1 and 2.

Figs. 1, 2 and 3 are respectively Figs. 1, 2 and 3 of my copending application Serial No. 314,189, now Patent No. 2,358,285, of which the present application constitutes a continuation-in-part.

Figs. 4 and 5 are respectively Figs. 1 and 2 of my copending application Serial No. 425,271 of which the present application constitutes a continuation-in-part.

Fig. 6 is a sectional elevation of a further embodiment of my invention.

Fig. 7 is an enlarged plan view of a portion of Fig. 6.

Fig. 8 is a phantom perspective drawing of a portion of Figs. 4 and 6.

Fig. 9 is a section of a portion of Fig. 8.

Fig. 10 is a detail of a conduit joining the assembly of Fig. 8.

Fig. 11 is an enlarged elevation, partly in section, of a portion of Figs. 4 and 6.

Fig. 12 illustrates a slight modification of a portion of Fig. 4.

Fig. 13 is a somewhat diagrammatic showing of a further embodiment of my invention.

Fig. 14 is a diagrammatic showing of a modification of Fig. 1.

Fig. 15 is a diagrammatic showing of a modification of Fig. 3.

Figure 4:
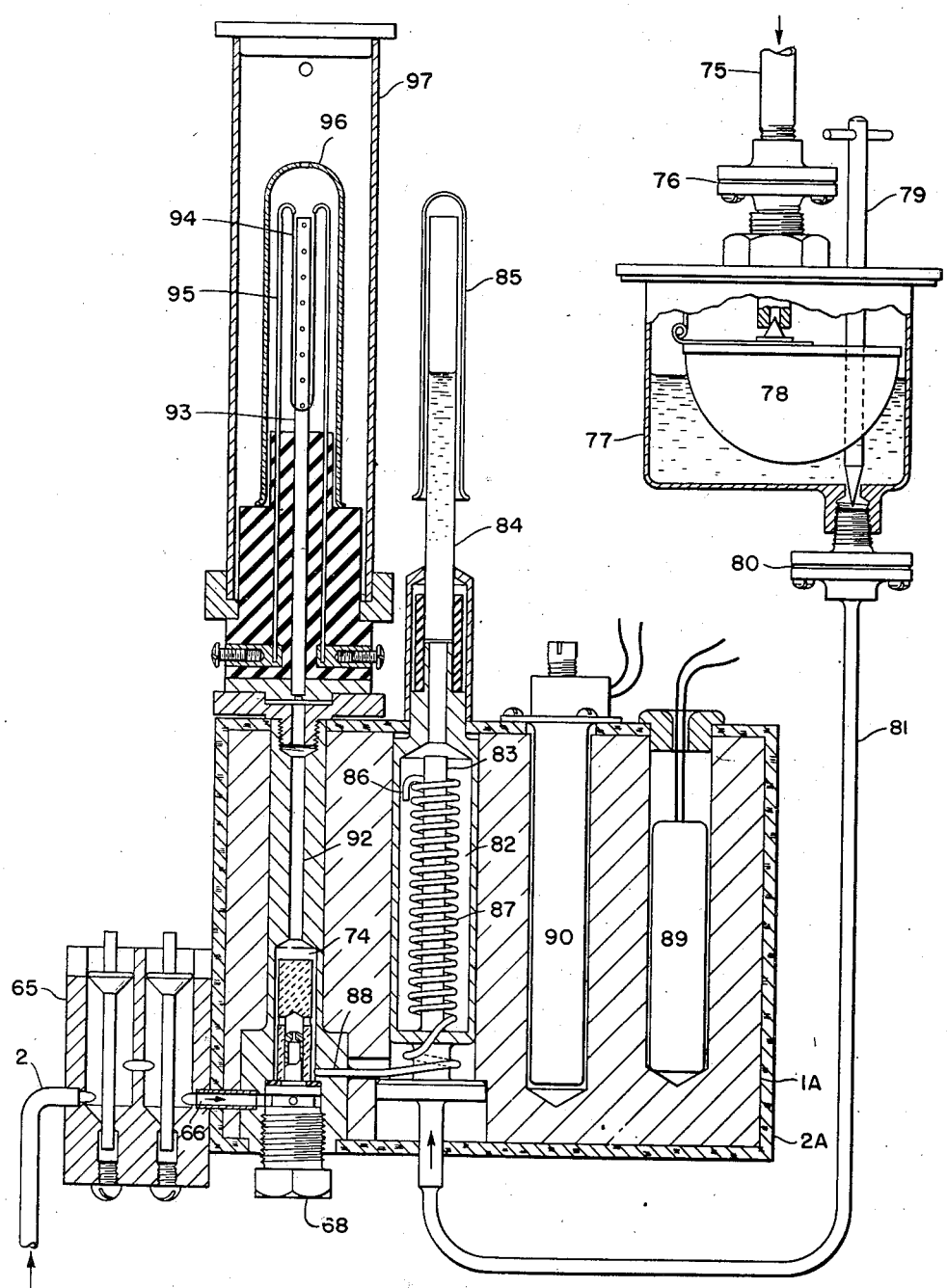
Fig. 4 is a sectional elevation of a preferred embodiment of my analyzer.

Referring now to Fig. 1 in particular, I illustrate therein a sectional elevation of one form of my analyzer construction. A continuous sample of the gases of combustion is withdrawn from a furnace (not shown) and led to the apparatus 1 by means of pipe 2. The stream of gas to be analyzed is supplied under pressure to the analyzer through the conduit 2. The necessary apparatus for continuously supplying to the conduit 2 a pressure stream of clean sample gas forms no part of the present invention. A satisfactory method and apparatus is disclosed and claimed in the copending application of Hines, Serial No. 406,838, now Patent No. 2,356,845. It is sufficient to say that desirably a continuous stream (hereinafter termed the sample) is supplied under pressure, and that the sample is representative of the main body of gaseous products of combustion which it is desired to sample and analyze for one or more constituents thereof.

The apparatus of Fig. 1 consists of a tank 3 partially filled with a liquid, as dibutyl-phthalate having a low vapor pressure, for purposes of maintaining a predetermined temperature within said tank and further for determining the heads of sample gases. The tank 3 is heated by heaters 6 and to which may be attached a thermal switch (not shown) sensitive to the temperature of the liquid in the tank.

The continuous sample of gas is forced through pipe 2 into cylinder 4 which extends into the liquid of tank 3 and has a plurality of orifices 5 at its base for the escape of any excess gas. The escaping gas bubbles upwardly and flows out through the loose fittings of the various cylinders or through holes that may be provided for it. From cylinder 4 the gas will continue through pipe 7 to a similar cylinder 8 having a closed top, the gas entering this cylinder near its base. Orifices 9 at the base again allow any excess gas to escape therefrom. This cylinder is provided with a threaded upper portion for purposes of final pressure head adjustment. Thus these cylinders 4 and 8 desirably determine the final pressure of the gas flowing into the detector chambers; the initial pressure being great enough to overcome the combined static head of the liquid on the submerged portions of the cylinders plus that necessary to force the gas through the detecting chambers.

I have found it to be desirable to arrange my analyzer so that gases would first be tested for combustible and then for oxygen content. In gases containing combustibles there is sometimes a deficiency of air. I therefore provide a predetermined quantity of air to insure there being sufficient oxygen present to burn any combustible in the gas sample. The air thus brought in (supplying means not shown) is treated similarly as the gas sample and flows through a similar pressure limiting means. It comes in on the opposite side of apparatus 1 through pipe 10 into cylinder 11 thence flows through pipe 12 into cylinder 13. I have made cylinders 8 and 13 substantially similar in construction, and the gas and air coming therefrom are in predetermined amount and pressure and temperature. By means of conduits 14 and 15 leading from 8 and 13 I permit desirable amounts of air and gas to pass into a mixing chamber 16 where occurs a thorough inter-mixing.

Above the mixing chamber and connected directly to it through a narrow passage 17 is the combustible determining chamber 18. In this chamber is suspended a detector wire 19, as platinum, and which is continually electrically preheated to a certain temperature. Thus any predetermined mixture of gas and air upon entering this chamber will come into contact with the heated detector and, if any combustible is present, burning will occur. The detector member 19 serves as a leg of a Wheatstone bridge circuit, which circuit is shown in Fig. 3 and which will be hereinafter explained, and any change in its resistance because of a catalytic burning on its surface will be indicative of the combustible content of the burned gases.

Now, gases having an excess air content are generally low in combustibles, if they contain any at all. Thus to continually determine excess air or oxygen it is necessary to add to the gas analyzed a predetermined quantity of a fuel. The fuel added will combine with the free oxygen, and a measure of such reaction will serve as an indication of the oxygen content. I add then, to the stream of gas from which all combustible has been deleted, a fuel vapor such as vaporized methanol, cause a reaction of the new mixture, measure it, deduct from such measure the possible initially added unburned air and get a resultant reading of the oxygen content of the gas sample. It must be clearly understood however that the determination of both combustibles and oxygen is made from the same gas sample. I do not divide my gas sample into two streams and test each portion. I perform my two analyses upon the same stream continuously. Thus I obtain complete and immediate information as to the quality of the test sample at all times, information that is truly representative of an instantaneous condition.

As stated, a fuel gas or vapor must be added to the gas sample to have it combine with the free oxygen to determine its content. I have found methanol desirable although other fuels in the same class may be used. I show in Fig. 1 a supply tank 20 containing a liquid fuel which will be later vaporized and added to the gas sample. The tank is mounted on an adjustable support 21 which enables an adjustment of it and the flow of the liquid. The liquid then flows into a cylinder 22, a section of which is submerged in the liquid of tank 3 of apparatus 1. Cylinder 22 primarily serves the purpose of freeing all entrained air from the liquid fuel, which air would later give an erroneous oxygen reading. I effect this release of air by bringing the liquid to a temperature just below its boiling point. The free air escapes from the cylinder through pipe 22A. I style this cylinder as a "deaerator." The liquid fed to the vaporizing chamber of apparatus 1 is therefore entirely free of entrained air.

From the deaerator liquid fuel is conducted to a vaporizing chamber 26 by means of a certain length of capillary 23 tapping the cylinder at a predetermined point, then wound around it for several turns before terminating in the vaporizing chamber. Thus, while the resistance of the capillary tubing is fixed, the flow of liquid fuel can be varied by vertically positioning the liquid tank 20. And the amount of liquid fuel fed to the vaporizer is at all times great enough to provide fuel vapor to combine with any amount of free oxygen in the gases tested.

The vaporizing chamber 26 to which capillary 23 leads has a stone vaporizer 27. The vaporizer (see Fig. 2) is of porous stone held in a cupped base 28 which has emerging through its center a portion of the capillary 23 extending sufficiently into the base of the stone vaporizer to serve as an additional holder thereof. That portion of the capillary in the stone vaporizer may have an orifice in its side, or more if necessary, in addition to the top opening to more widely distribute the liquid fuel to the vaporizer. The stone has the inherent ability in becoming thoroughly saturated with the liquid fuel constantly and immediately, presenting its entire surface to a certain depth for vaporization. Furthermore, it never needs replacement, and is very easily cleaned upon occlusion with foreign matter. The vaporizer substantially fills its chamber 26, causing the test gas to envelop it in its upward travel, picking up fuel vapor.

I do not depend merely upon the passage of gas about the vaporizer to carry off the necessary amount of vapor fuel, for I have found that not enough at times is thereby evaporated. I therefore provide a positive means of vapor fuel generation by heating the vaporizing chamber to a certain temperature as shown by the resistance 29 wound around it. I thus make certain of a definite generated amount of vapor fuel at all times, avoiding the uncertainties of ordinary evaporation. Furthermore, since it is not feasible to evaporate a quantity of vapor fuel in proportion to a varying free oxygen content I vaporize a constant maximum value although but a portion of it may be at any one time utilized. And I do not need to change my fuel or alter it for any value of excess air.

The gaseous mixture flowing upwardly from chamber 18, where the original combustible in the gas stream has been deleted, surrounds the vaporizer and fills the chamber, thoroughly intermixing with the generated fuel vapor. The new mixture continues upwardly through conduit 31A into a tube 31, which tube spreads the mixture on an adjacent catalyst 32. Distribution of the mixture is carefully effected through a plurality of evenly spaced apertures 33 in tube 31 facing the vertically suspended catalyst. The catalyst as shown is hung freely from supports 34, its bottom end going through a small fixed circle or cylinder 35 preventing it from swaying and changing its position due to a tilting of the entire device or perhaps the velocity of the gaseous mixture from the distributing tube.

The new mixture, upon striking the catalyst 32, is burned, the reaction occurring between the added fuel and the excess air in the gas sample, and any difference in temperature, when measured, will be representative of oxygen content. Thus I have described two independent yet substantially simultaneous gas constituent determinations of the same gas sample.

In the once through gas conducting construction of Fig. 2 I show catalyst 32 confined by a cylinder 30. This cylinder may be of any good heat resisting material. If it is desirable to note the occurrence of a reaction therein, the cylinder may be of Pyrex glass. To further insulate against loss of heat I have provided a polished aluminum tube 36, Fig. 1, which is effective in preventing heat radiation.

While I have effected two separate reactions, one for combustible and the other for oxygen, the latter determination is not exactly a true one for the initially added air must be compensated for. Where a sizable quantity is added to the gas sample it will not all combine with the combustible and a portion of that amount will be included in the oxygen reading. Regardless, however, of the small amount of combustible that may be found and therefore a desire to diminish the added air, I have found it a good policy to maintain a definite amount of air over and above that to be utilized in the burning with a combustible to prevent reducing atmospheres about both the combustible detector and the oxygen determining catalyst, for such atmospheres will greatly alter the resistances thereof and give erroneous readings.

I effect the compensation of the added air by a particular interconnection of the two Wheatstone bridges embodied in my apparatus and shown in detail in Fig. 3. In this representative example the combustion chamber 18, through which the sample gas first flows as indicated by arrows, holds detector 19 which forms a resistance of bridge 37. The bridge consists of, further, the comparison or constant leg of the circuit, as customarily shown at 38, a fixed resistance 39, the adjustable or balancing resistance 40; the bridge having a source of potential. Resistances 41 and 42 are inserted for calibration purposes. In operation, a burning in chamber 18 will cause a change in resistance of the detector member, therein deflecting the conjugate positioned galvanometer 43, causing it to make contact with either terminal 44 or 45 to which are attached conductors 46, 47 leading to opposed fields 49, 50 of a reversible motor 51. Energization of either field winding will cause the motor to rotate in a dictated direction an amount equivalent to the time duration of the galvanometer deflection against the particular contact. The motor 51 is attached through a gearing device 52 (diagrammatically shown by a dash line) to an index arm 53 whose other end moves along resistance 40 of the bridge, rebalancing the bridge. Upon a rebalance, the galvanometer needle will again assume its neutral position. The index arm will move relative to index 54, indicating the combustible content.

A similar bridge circuit 55 contains catalyst 32 enclosed in the oxygen determining chamber 30, and its associated rebalancing means. Thus a change in resistance of catalyst 32 will result in operation of motor to simultaneously rebalance bridge 55 and indicate oxygen content by movement of index arm 56 relative to an adjustable resistance 40A and an index 56A.

As stated hereinbefore a part of the total initially added air must be deducted from the oxygen reading or in some way compensated for. I effect this correction by means of interconnecting linkage of the two index arms 53 and 56. I have pivotally suspended to index arm 56 a link 57, and, to index arm 53, a link 58. Joining links 57 and 58 is a horizontal link 59. Now since a definite amount of CO, or other combustible, combines with a definite amount of air, index 54 may be made to read in CO or equivalent oxygen. The motion of index arm 53 may be said to represent the quantity of either. It may indicate the CO value on the index alone, yet in motion represent the equivalent oxygen content. Since horizontal link 59 is positioned by two oxygen values, it at some point as at 59A, represents the true value; that is, point 59A at all times represents an algebraic summarization of the two values of oxygen. And link 60 attached to such point by actuating an index arm 61 relative an index 62 will, at all times, indicate the true oxygen content in the test sample.

I further show in connection with Fig. 3 a pilot valve 64 of the type described in my Patent No. 2,054,464. This valve upon actuation by link 63, pivotally connected to the oxygen index arm 61, is adapted to relay a proportionate fluid pressure to a regulating apparatus (not shown) manipulating a damper or a fuel supplying means as may be desirable.

It is also apparent from my Fig. 1 that the apparatus may be used individually for determination of combustible or oxygen content. All that is necessary is to use only one or the other of the bridge circuits. And a still further adaptation is its use as a B. t. u. indicator of combustible gases. In the latter instance only the combustion chamber 18 need be used with bridge circuit 37. A predetermined amount of air is brought in and mixed with the gas, the varying heat given off is reflected in the detector's resistance and serves as a measure of the B. t. u. value of the gas tested. A still further use is that of indicating certain desirable atmospheres in certain furnaces, as reducing or oxidizing atmospheres. In such instances a single constituent determination may not be necessary. While a reducing atmosphere will always indicate an excess of combustible and a lack of oxygen; an oxidizing atmosphere will indicate otherwise, and a swing one from the other will be immediately reflected in either bridge. Such a general indication of a swing of one atmosphere to another may prove sufficient. In this instance the summarizing linkage joining both bridges may be dispensed with.

Referring now in particular to Fig. 4, the sample arriving at the analyzer through the conduit 2 enters a flow regulator 65, which is shown in greater detail in Fig. 8, and which will be hereinafter specifically described. Suffice it to say here that the sample in passing through the regulator assembly 65 emerges through a duct 66 at a substantially uniform pressure and rate of flow to enter an annular channel 67 (refer to Fig. 11) of a member 68. The member 68 is provided with one or more holes 70 leading from the annulus 67 to a center passage 71 having an exit orifice 72. It is thus clear that uniform pressure flow of the sample gas, controlled by the regulator 65, will be discharged through the orifice 72 to the interior of a porous stone vaporizer 73, which rests by gravity as a shroud to the projection of member 68 containing the passage 71 and the orifice 72.

As clearly evident in Fig. 4, the member 68 is assembled in the analyzer so that the annulus 67 is aligned with the duct 66 and that the porous stone vaporizer 73, resting by gravity upon the member 68, is retained in a substantially vertical position in a mixing chamber 74.

As a preferred fuel for combustion of the free oxygen I supply a vaporizable liquid fuel, such as methanol or methyl alcohol, in liquid form. The liquid may be in any sort of a container feeding by gravity through pipe 75 and a filter 76 to a float chamber 77 containing the float 78. The level of liquid in the float chamber 77 is controlled by the float 78, the liquid passing through a filter 80 to a supply pipe 81 leading to the analyzer assembly 1A.

The liquid fuel flows by gravity from the pipe 81 to a chamber 82 from the open upper end of a standpipe 83 extension of the pipe 81. Filling the chamber 82, the liquid rises in a glass sight tube 84 open at its top to the atmosphere and loosely capped by a dust seal 85. The level in the sight tube 84 is the same as the liquid level in the float chamber 77 and remains substantially constant. From the chamber 82 the liquid enters the open end 86 of a coiled tube 87 of small capillary connected at its lower extremity 88 to discharge into the mixing chamber 74 adjacent the porous stone vaporizer 73.

The arrangement just described provides a deaerator and liquid fuel rate control. The chamber 82 and the liquid fuel contained therein is uniformly and continuously heated, by means of a heater 89, to a temperature slightly below the vaporization temperature of the liquid but high enough to liberate any air with which the liquid may be saturated. Such liberated air finds its way upward through the sight tube 84 to the atmosphere.

The rate of supply of vaporizable liquid fuel through the discharge 88 (to the mixing chamber 74) is controlled by a combination of the liquid head vertically between the discharge 88 and the liquid level in the tube 84 and the flow restricting capillary tube 87 through which the liquid must pass from the chamber 82 on its way to the discharge 88. This combination of head and capillary restriction is designed to regulate the rate of liquid flow leaving the exit 88 to a flow rate proportioned to the gas sample entering the mixing chamber through the orifice 72. It is apparent that the length of the capillary tube 87 is fixed when manufactured and that only the head of liquid provides a variable adjustment of the rate of liquid flow through the discharge 88. I may provide means whereby the float chamber 77 is vertically adjustable to vary the head effective at the point 88 for the calibration of individual analyzers.

Liquid fuel leaves the discharge 88 to the lower end of mixing chamber 74 against and around the porous stone vaporizer 73. Capillary attraction saturates the vaporizer 73 for a portion of its vertical length. The sample gas leaves the orifice 72 to the interior of the vaporizer 73, passes therefrom through radial passages 91, through the mixing chamber 74 around the upper portion of the vaporizer 73 and to the exit channel 92. The sample gas contacts the interior and exterior of the vaporizer 73, vaporizing the liquid with which the stone 73 is saturated and thoroughly mixing therewith. This wiping vaporizing action regulates the vertical height on the porous stone 73, which is saturated or partially saturated with liquid. Obviously, it is not desired that the chamber 74 be flooded with liquid fuel, and a control of the vertical head of liquid available at the discharge 88 regulates the height on the stone 73 which is wet relative to the portion which is substantially dry or wiped free of liquid.

Inasmuch as the sample gas and the liquid fuel both pass through channels in the heated metallic block 1A to a mixing chamber and vaporizer which is also contained in the block 1A, there will be an equilibrium temperature attained for the sample gas, the liquid fuel and the mixture of gas and vapor fuel passing through the exit channel 92 to the analyzer cell. The sample gas flow and the liquid fuel flow are individually regulated to a uniform rate of flow and in proper proportionality to each other.

The mixture of sample gas and fuel vapor passing upwardly through the exit channel 92 enters a diffuser tube 93 having a plurality of minute openings adjacent a catalytic wire 94 which is suspended from conductor posts 95. The analyzer cell is loosely housed by a glass or similar cylinder 96 having an exit at its top for the discharge of products of combustion from the catalytic burning on the wire 94. Surrounding the cell is a metallic protection tube 97.

Figure 5:
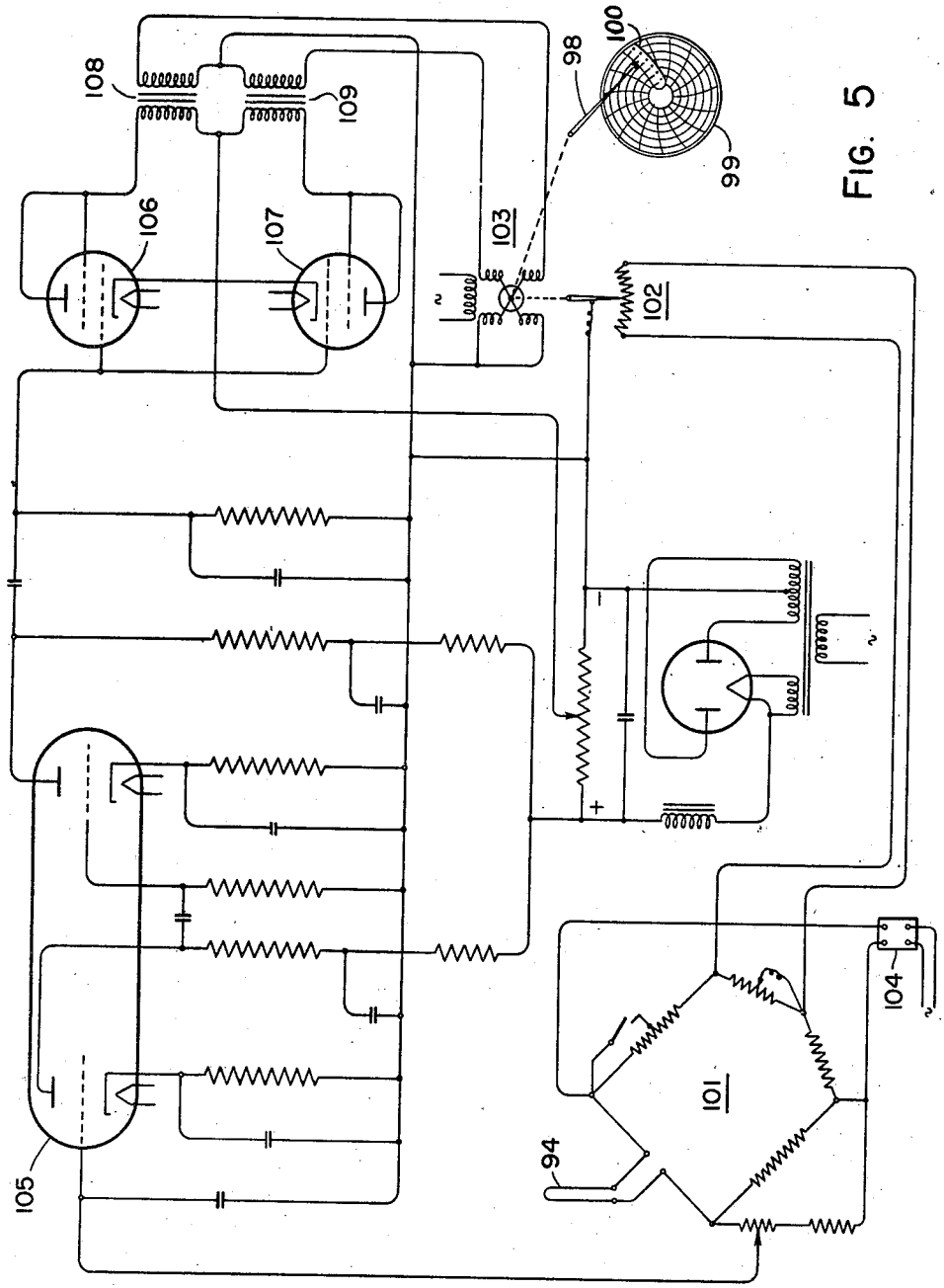
Fig. 5 is a diagrammatic wiring diagram of the analyzer-recorder of Fig. 4.

Referring now to Fig. 5, I show thereon in diagrammatic fashion the electrical circuit, of which the catalytic element 94 forms a part, for continuously indicating or recording the percentage of free oxygen or excess air in the sample gas flow. I have illustrated the analyzer arranged to visually exhibit, by means of a movable index 98 cooperating with a time revoluble chart 99 and scale 100, the percentage of free oxygen as excess air. The index, chart and scale are merely specific forms of exhibiting means which may take a wide variety of other forms, as will be evident to those skilled in the art. Certain features of the electrical circuits illustrated in connection with the present invention are disclosed and claimed in the copending application of John D. Ryder, Serial No. 424,281, now Patent No. 2,333,393.

To provide an accurate and sensitive measuring system I preferably employ the null or zero balance method wherein a variable effect of measurable value is maintained equal to or in some predetermined proportion to the electrical effect produced by the variable, and hence becomes a measure of the variable. In Fig. 5 I employ an alternating current Wheatstone bridge generally indicated at 101 and having as ratio arms the element 94 and an adjustable resistance 102. The resistance 102, which is varied in consonance with the index 98 by a reversible motor 103, is the balancing resistance and, through means hereinafter described, is continuously varied to maintain the Wheatstone bridge in balance, and hence the magnitude thereof becomes a measure of the resistance of the element 94, and inferentially of the variable to which the latter is sensitive. The catalytic wire 94 forms a variable impedance whose electrical resistance varies with temperature as a result of catalytic combustion thereon.

The bridge 101 is supplied with alternating current through a voltage regulator 104, and the element 94 is normally heated to a sufficiently high temperature so that catalytic burning will start on the surface of the wire 94 when the elements of combustion are present. The output of the Wheatstone bridge 101 is put through a two-stage amplifier, such as a double triode resistance couple device 105 sensitive to polarity or phase of the current in the output conjugate conductor of the bridge 101, for controlling motor control tubes 106, 107. In the output circuit of the tubes 106, 107 are connected transformers 108, 109 selectively controlling the direction of rotation of the reversible motor 103.

In general, assuming a condition of equilibrium of the circuit, if the oxygen content of the sample gas deviates in one direction or the other, then the catalytic burning on the platinum catalyst 94 will increase or decrease, thereby causing a variation in electrical resistance to current flow through the bridge leg 94. This results in an unbalance of the bridge 101 in one direction or the other with a resulting change in polarity or phase in the output circuit of the bridge. Such change (from an equilibrium condition) in polarity or phase, acting through the amplifier 105, controls the tubes 106, 107 and thereby the transformers 108, 109 to cause rotation of the motor 103 in predetermined direction and for a time so long as the condition of unbalance exists. As soon as the motor 103 starts to rotate in predetermined direction, it causes a positioning of the contact arm along the balancing resistance 102 in direction to restore the bridge 101 to balance. When this has been accomplished, then an equilibrium condition exists in the entire circuit and the motor 103 ceases to rotate until again the circuit becomes unbalanced. The new position of the contact arm along the balancing resistance 102 is representative of the new value of resistance 94, and thereby is representative of the new value of free oxygen or excess air in the sample gas stream. Simultaneously with positioning of the contact arm along the resistance 102 the motor 103 moves the index 98 relative to the scale 100 and to the recording chart 99 so that a visual indication is continuously available of the percent of free oxygen or of the percent of excess air in the sample gas. At the same time, a chart record is made in desired units of measurement.

Referring to Fig. 12, I illustrate therein a modification of a portion of Fig. 4 used under certain operating conditions. For example, in certain instances it is desirable to continuously bias the operation of the analyzing cell by admitting thereto a constant predetermined amount of oxygen. If, for example, this bias oxygen (as atmospheric air) were the equivalent of 3% free oxygen, then the analyzer would indicate 3% free oxygen in the mixture passing through the exit channel 92 when, for example, the sample gas were pure nitrogen with no free oxygen entering through the duct or passage 66. Such a biasing action is particularly desirable if the expected free oxygen content of the sample is very low, as for example, .1 or .2 of a percent of volume. The bridge action would be as though the sample contained 3.1% free oxygen, but the chart and scale would be graduated to read correctly the oxygen content of the sample, not including the bias oxygen.

I have found that when an extremely low percentage of free oxygen exists in the sample stream it is advisable to have bias air or oxygen, so that there will always be a certain amount of oxygen combining with the vaporized fuel on the catalytic wire. The burning of vaporized liquid fuel may result in some cracking or decomposition of such vapors with the possibility of a resultant poisoning of the catalyst unless a certain minimum percentage of free oxygen is available to combine with the fuel vapors. Thus, under these conditions, it is usually advisable to have bias air supplied.

In order to continuously supply to the mixing chamber 74 a uniform flow of bias air (representative of a uniform supply of free oxygen) I provide (referring to Fig. 12) a duct 110 entering the annulus 67 substantially opposite the entrance of the duct 66. The duct 110 leads from a pressure regulator 65A for regulation of the pressure, and thereby the rate of flow, of the atmospheric air. The air leaving the regulator 65A under pressure passes through the duct 110 and through a tiny orifice into the annulus 67. Ordinarily the amount of bias air desirable would amount to about 20% by volume of the sample gas flow entering the annulus 67 through the duct 66. However, the pressure of the bias air in the duct 110 must be substantially the same as the pressure of the sample in the duct 66, or else the bias air cannot enter the annulus 67 against the flow from the duct 66.

As a practical matter I have determined that the pressure of the sample flow in the pipe 2 arriving from the sampling and cleaning apparatus may vary from three inches of water to five pounds gage pressure. I have so proportioned and designed the regulator 65 that the pressure available in the duct 66 is readily held to a pressure of 1.6 plus or minus .01 inch of water through this variation in pressure in the pipe 2. The bias air is supplied to the regulator 65A from any available source of compressed air and may, for example, be at around 25 pounds per square inch gage pressure at the entrance to the regulator. The pressure at the exit of the regulator, however, in the duct 110, is slightly higher than the pressure of 1.6 inches of water in the duct 66. The relatively small orifice exit of the duct 110 into the annulus 67 limits the rate of flow of bias air to approximately twenty per cent by volume of the flow of gas sample from the duct.

I will now describe more in detail the construction and operation of my improved pressure regulator 65 as shown in connection with the sample flow in Fig. 4, and in connection with the bias air supply in Fig. 12, and to enlarged and greater detail in Fig. 8.

Referring in particular to Fig. 8, it will be seen that the flow regulator 65 comprises preferably a metallic block 111, in which are two longitudinal bores 112 and 113 of approximately one-half inch diameter each. These bores 112 and 113 are roughly coned at the bottom and open into a short cylindrical passage closed at the lower end by removable screws 114. Positioned in the bores 112, 113 respectively are members 115, 116, each comprising a long stem with a conical head near its upper end. It is to be noted that the assembly of Fig. 8 is approximately double scale to the construction which I preferably use. The members 115, 116 are shown as resting by gravity against the ends of the screws 114. In this position, and with no flow of gas under pressure entering the conduit 2, the periphery of the base of the conical section of the member 115 (or the member 116) is adjacent the lower end of a cross-slot 117 or a cross-slot 118 respectively. These cross-slots are milled across the upper end of the assembly block 111 through the center of the bores 112 and 113. They are preferably of a different width, with the slot 117 of greater width than the slot 118.

The gas sample flow arrives at the conduit 2 from the cleansing-sampling apparatus at a pressure which may vary from say three inches of water to five pounds gage pressure. This sample flows into the bore 112 below the conical head of the member 115, and the resulting pressure built up in the bore 112 raises the member 115. In doing so, a portion of the slot 117 at either side of the bore 112 is uncovered in varying degree by upward positioning of the conical head of the member 115. This allows a flow of the sample from the bore 112, below the conical head, to atmosphere through the two portions of the slot 117 at opposite sides of the bore 112. A variable portion of the sample entering the bore 112 will be wasted through slot 117 so that a constant predetermined pressure will be maintained in the bore 112 depending upon the weight of the member 115 and cross-sectional area of the conical head.

For best regulation I have found it desirable to have two such assemblies in series. A passage 119 is provided from the bore 112 to the bore 113 below the conical heads of the members 115, 116. The reduced pressure flow of the sample is effective through the passageway 119 to the interior of the bore 113 where it acts in turn upon the conical head of the member 116, positioning the member 116 vertically relative to the cross-slot 118 to a position dependent upon the weight and diameter of the conical section of the member 116 and upon the width of the slot 118. Thus through proper design I am enabled to obtain a static pressure within the bore 113, and in the outlet duct 66 at a uniform pressure, for example, of 1.6 inches of water plus or minus .01. This static pressure being obtained when the pressure available in the conduit 2 varies from three inches of water to over five pounds gage pressure. I desirably accomplish this in two stages, as illustrated in Fig. 8, and as just described.

The cylindrical heads of the members 115, 116 have approximately .0015 to .0030 inch diameter clearance, or just enough to allow freedom of positioning of the members. In general, the weight design of the members individually is just enough to offset the pressure effective on the conical head of the member times the area of said head, and to result in the uncovering of approximately one half of the vertical elevation of the slots 117 or 118.

When there is no pressure flow through the assembly 65 the members 115, 116 may rest by gravity upon the ends of the screws 114. The screws 114 may either or each have a minute axial hole providing a continuous tiny bleed of air to discharge to the atmosphere any dirt, moisture or other foreign material which may be carried into the assembly 65 through the pipe 2.

It is essential that the pressure effective through the conduit passage 119 be representative only of the static pressure within the bore 112. I have found that if the conduit 2 enters on approximately the center line of the bore 112, the mushrooming flow will react to give an erroneous upward force on the conical head of the member 115. If the conduit 2 enters the bore 112 substantially tangentially to the periphery or wall of the bore, a vortex is created, which adversely affects the vertical positioning of the member 115. Furthermore, the centrifugal force of the sample in vortex motion is such that the flow entering the communicating passage 119 is at a pressure, the resultant of the static pressure within the bore 112 plus an impact or velocity pressure created by the centrifugal motion. I shape the inlet conduit 2, as shown in detail in Fig. 10, i. e., a radial opening 2B ahead of a closed end of the tube, and provide a possibility of rotating the conduit 2 prior to fastening it permanently in place. I have found that through this construction I am enabled to insert a short section of conduit 2, as shown in Fig. 8, and after applying the expected pressure flow to the outer end of the conduit 2, I can slowly rotate the conduit 2 to obtain a position for the same (direction of the opening of the radial hole 2B) wherein all impact or velocity effect of the sample entering the bore 112 through the tube 2 is eliminated. In making this test I remove the member 116, plug the bore 113 with a cork, and attach the duct 66 to a manometer. By slowly rotating the conduit fitting 2 I can increase or decrease the pressure effective upon the manometer above and below a predetermined value. With the conduit 2 at the position neutral between such increase and decrease I am assured of a measurement of static pressure within the bore 112 uninfluenced by impact or velocity of flow.

A similar condition exists in connection with the flow through the passage 119 into the bore 113. Without taking special provisions, I would encounter a vortex action and the centrifugal force effect would be added to the static pressure elect upon the fluid in the outlet duct 66. To counteract this erroneous action I provide a tubular screw 120 (refer to Fig. 9) having a side outlet opening and threaded into the opening of the passage 119 into the bore 113. The usual desirable adjustment is with the screw 120 assuming a position approximately as shown in Fig. 9. In this position the side outlet opening of the screw 120 is so positioned that the impact effect of the sample entering the bore 113 through the passage 119 is eliminated, and pressure effective in the outlet duct 66 is the static pressure of the fluid within the bore 113. Having adjusted elements 2 and 120 during calibration of the unit they are then soldered permanently in place.

The present arrangement of Figs. 6 and 7 does not measure the combustible in the sample gas, but merely burns it out, and furthermore will burn out or eliminate any possibility of poisoning of the catalyst measuring element 94A. With this arrangement the indicator or recording pen will move either way from zero free oxygen in the gas sample, i. e., to show the presence of free oxygen or to show a deficiency (presence of combustible) of free oxygen in the sample.

Fig. 7 is a plan view of that part of the Fig. 6 assembly incorporating flow regulators 65B and 65 as well as a burner assembly 121.

I have found that occasionally something in the gas sample (as distinguished from the vapor fuel) may poison the catalytic analyzing wire 94A. One theory is that the sample gas may contain methane or $CH_4$ which cracks on the surface of the wire 94A and deposits free carbon on the wire. This, however, might be any similar hydrocarbon present even in minute percentages in the gas sample stream. I do not believe that CO in the gas sample has any poisoning effect, nor that it breaks down to give free carbon. Apparently, a hydrocarbon (such as methane) present in the gas sample will crack or break down on the filament 94A and, if a reducing atmosphere is present, then the deposit of carbon will not burn off irrespective of the temperature to which the wire may be heated. The catalytic wire normally is heated to about 1000° to 1500° F. The depositing of free carbon on this wire (or poisoning of the wire) affects both the liberation of heat from the wire and the contact of the gas-vaporized fuel mixture with the wire. Thus the electrical resistance variation of the wire, and consequently the measurement of a constituent of the gas sample, is affected.

I have found that if the gas sample plus a controlled flow of biasing air is first lead over a burner wire 123 heated to about 1800° to 2000° F. it will crack out any hydrocarbon combustible which may be present in the gas sample. Here no measuring is taking place and it is immaterial whether some poisoning of the wire 123 occurs. However, the temperature at which this wire is heated, plus the fact that it is surrounded with an oxidizing atmosphere, helps keep the burner wire clean and free.

The sample gas then reaches the analyzing wire 94A with an excess of bias air, a supply of vapor fuel, and with no combustible from the original sample present. Obviously the measuring circuit must be compensated for the amount of bias air which has been introduced. So long as the rate of flow of gas sample, as well as the rate of flow of bias air, are controlled, then such compensation of the electrical measuring circuit may readily be accomplished.

With a nitrogen sample and no bias air present, the indicator or recording pen is adjusted to read at zero on the index or chart. The desired uniform flow of bias air is then added to the nitrogen sample flow and the pen would read say 3% to 4% on the chart. The Wheatstone bridge is then adjusted to return the pen to zero on the chart for this predetermined added constant supply of bias air to the nitrogen sample. When the nitrogen sample is replaced by the actual gas sample to be analyzed (assuming no combustible present in the sample gas) the pen records the net free oxygen of the sample, namely, the original free oxygen content minus that which has been added as bias air. If there is any combustible present in the sample gas, then the pen records the net free oxygen of the sample, namely, the original free oxygen content minus that which has been used in combining with or burning the combustible present in the original sample.

Referring again to Figs. 6 and 7, it will be seen that the sample gas flow is admitted through a conduit 2 to the flow regulator 65, while a bias air supply is admitted through a conduit 122 to the flow regulator 65B. The individual flow regulators are designed and adjusted (as previously described) to provide a desired pressure flow of the two fluids prior to mixing.

As will be seen from Fig. 7, the bias air entering through the conduit 122 passes through the flow regulator 65B to a tubular passage 124 surrounded (through the regulator 65) by an annular opening to which the sample gas flow is admitted. In the burner assembly 121 the two fluid flows combine in a passage 125 leading to the heated burner wire 123 from which the products of combustion discharge through a conduit 126 to the annulus 67 of the member 68. From there the combined gaseous fluid passes through the orifice 72 and the hole 91 to the mixing chamber 74 where is added the vaporized fuel. It will be seen that the sample emerging from the orifice 72 is composed of the original gas sample stream from which any combustible has been burned and the added bias air remaining after some may have been used in combining with any combustible.

In Fig. 13 I illustrate the possibility of using a single bridge having two catalytic wires wherein one of the wires incorporates a burning of the combustible in the sample and the other leg the burning of the free oxygen. The Wheatstone bridge 191 has a catalytic leg 94 and a second catalytic leg 127. The bias air and the sample gas pass separately through the flow regulators 65B and 65. Thereafter the regulated flows join in a mixer 128. The mixture is then divided into two streams, the one stream passing directly to the combustible analyzing wire 94. The second branch of the mixture stream passes to the analyzing catalytic wire 127 along with a supply of vapor fuel. The wire 127 thus analyzes for free oxygen in the sample.

In this example the single recording pen can go above or below zero (zero percentage of free oxygen). For example, if there is no free oxygen present in the sample, but some combustible gas present, then the catalytic wire 127 will remain at a resistance value of zero oxygen while combustion would take place on the wire 94. This would tend to unbalance the bridge in the opposite direction from a condition of zero combustible and some free oxygen in the gas sample.

Fig. 14 is somewhat similar to Fig. 2, but includes the improved design of catalytic wire 94A shown in Fig. 6.

Fig. 15 illustrates a portion of Fig. 3 in which the motors 129 and 130 may be of the shaded pole type.

In general I have illustrated and described certain preferred embodiments of my invention particularly related to the analyzing of a gas sample flow as to its constituents. The analysis may provide an indication of the percentage of combustibles in the sample stream, or of the percentage of free oxygen in the sample stream, or of the net free oxygen, taking into account that portion of the free oxygen which might be needed to offset the combustibles in the sample. I preferably employ a constant supply of bias air (as representative of free oxygen) to add to the sample gas stream for combining with any combustibles present. I furthermore contemplate a burner for the combustible as well as to prevent any poisoning of the main measuring catalytic member.

What I claim as new and desire to secure by Letters Patent of the United States is:

1. A continuous gas analyzing apparatus containing, in combination, a pair of pressure and flow regulating devices, means for connecting a supply of gas to be analyzed, and air, both under pressure, each to one of said devices, a combustion chamber connecting with and to which the devices discharge and wherein any combustible present in the gas is combined with oxygen from the air supply, a mixing chamber communicating with and to which the combustion chamber discharges, means including a conduit connecting with a source of liquid fuel and the mixing chamber, a vaporizer associated with said conduit for supplying vapor fuel to the said mixing chamber, a detector chamber communicating with and receiving fluid from the mixing chamber and a catalytic detector in said detector chamber and sensitive to the net free oxygen in the gas being analyzed, and a heated block assembly encompassing said vaporizer and said mixing chamber.

2. A continuous gas analyzer including, in combination, a heated metallic block assembly, a pressure flow regulator for gas and a similar separate flow regulator for air incorporated in said assembly, means for connecting a source of gas to be analyzed to the first mentioned regulator, and means for connecting a source of air to the second mentioned regulator, a combustion chamber on the assembly having a heated catalytic wire therein, a mixing passage communicating with and fed by the two said regulators and discharging to said combustion chamber wherein any combustible content of the gas to be analyzed is burned out, means for connecting a supply of liquid fuel to the analyzer, means associated with the last named means for vaporizing the liquid fuel, a mixing chamber connected in communication with said combustion chamber and said vaporizing means, a detector chamber on said assembly connected in communication with said mixing chamber and having therein a catalytic detector wire over which the mixture is passed from the mixing chamber, a Wheatstone bridge having as one leg the said detector wire, and means under control of said Wheatstone bridge arranged to provide an indication from a calibrated neutral over the range from a proportion of combustible to a proportion of net free oxygen in the sample being continuously analyzed.

3. A continuous gas analyzer including, in combination, a pressure flow regulator for gas and a similar separate regulator for air, means for connecting a pressure source of gas to be analyzed to the first mentioned regulator, means for connecting a pressure source of air to the second mentioned regulator, a combustion chamber containing a heated filament and connected to and communicating with both of said regulators for burning out any combustible in the gas flowing thereto, a mixing chamber connected in communication with said combustion chamber, means for connecting a source of fuel to said mixing chamber, said mixing chamber receiving gas and fuel from said combustion chamber and said fuel source respectively, and an analyzer cell connected in communication with said mixing chamber and containing an electrically energized wire forming one leg of a Wheatstone bridge, said Wheatstone bridge containing a measuring instrument arranged to provide an indication from a calibrated neutral over the range from a proportion of combustible to a proportion of net free oxygen in the gas being analyzed.

4. A continuous gas analyzing apparatus comprising a heated block assembly including an analyzer cell in which an electrically heated filament therein forms one leg of a measuring circuit, a fluid mixing passage leading to the said analyzer cell, passage means connecting said fluid mixing passage to a source of fuel supply, a pair of fluid pressure regulators affixed to the heated block assembly, means for connecting one of said regulators to a source of gas to be analyzed, means for connecting the other of said regulators to a source of air, means including a chamber interposed on the assembly for burning combustibles out of a gas supplied thereto, common passage means connecting the discharge sides of said regulators to the said chamber for supplying a mixture of air and gas to the latter, and passage means connecting said chamber to said fluid mixing passage for supplying to the latter a gaseous mixture to be analyzed.

CLARENCE JOHNSON.

REFERENCES CITED

The following references are of record in the file of this patent:

UNITED STATES PATENTS

| Number | Name | Date |
|---|---|---|
| 78,280 | Harden | May 26, 1868 |
| 2,211,627 | Morgan et al. | Aug. 13, 1940 |
| 2,073,249 | Morgan et al. | Mar. 9, 1937 |
| 1,900,884 | Lusby | Mar. 7, 1933 |
| 2,084,954 | Griswold | June 22, 1937 |
| 2,005,036 | Howe | June 18, 1935 |
| 1,321,064 | Lamb et al. | Nov. 4, 1919 |